March 12, 1957     D. M. HARVEY     2,784,760

TIRE CHAIN CONSTRUCTION

Filed March 24, 1948

INVENTOR.
Draper M. Harvey
BY Nathaniel Frucht
ATTORNEY

United States Patent Office 2,784,760
Patented Mar. 12, 1957

2,784,760

TIRE CHAIN CONSTRUCTION

Draper M. Harvey, Hingham, Mass., assignor to Earle B. Harvey and Associates, a partnership consisting of Earle B. Harvey, Belmont, and Draper M. Harvey, Hingham, Mass.

Application March 24, 1948, Serial No. 16,742

2 Claims. (Cl. 152—245)

The present invention relates to automobile and truck tire chains, and has particular reference to an improved cross chain therefor.

The principal object of the invention is to provide an improved cross chain construction for a tire which will minimize rolling or sliding when the chain comes in contact with the roadbed under ice and snow conditions.

Another object of the invention is to provide a tire cross chain with movable ground gripping elements having angular projections which restrict and obviate uncontrolled side movements of a vehicle on ice or snow, the gripping action being assisted by the weight and thrust of the vehicle.

Another object of the invention is to provide a novel ground grip element for use in a cross chain which utilizes the resilience of the tire to increase the ground gripping effect.

An additional object of the invention is to utilize ground grip elements which are movably locked within the links of a cross chain.

A further object of the invention is to provide a novel ground grip element for a cross chain which has ground indenting teeth designed to continually present a sharpened edge or bevel to a roadbed having ice and snow conditions, and to maintain the sharpened edge or bevel as metal is removed during normal wear and use on the roadbed.

With the above and other advantageous objects in view, the invention consists of a novel arrangement of parts more fully disclosed in the detailed description following, in conjunction with the accompanying drawings, and more specifically defined in the claims appended thereto.

Figure 1:
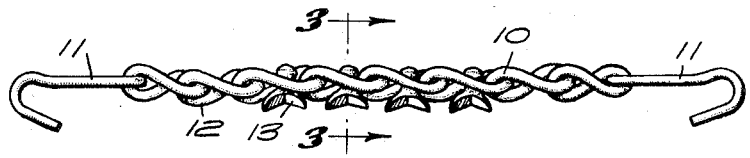
Fig. 1 is a side elevation of an illustrative cross chain embodying the invention.
Figure 2:
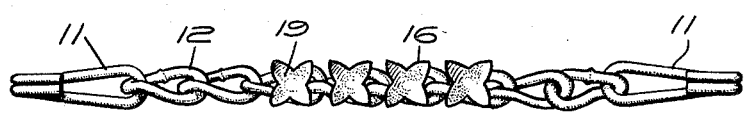
Fig. 2 is a bottom plan view thereof.
Figure 3:
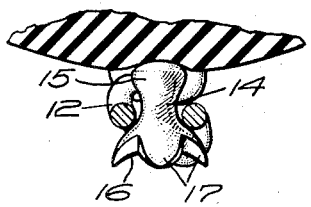
Fig. 3 is an enlarged section on the line 3—3 of the cross chain of Fig. 1 when mounted on a tire.
Figure 4:
Fig. 4 is a top plan view of the novel ground grip element of Fig. 3.

The tire chains heretofore used have utilized cross chains with links of the cross chain type for gripping the ground as the tire turns. Such cross chains, however, have been found to roll and slide instead of digging into the ground, and cross bars of straight or V form have been welded to the links to increase the ground gripping action.

I have found, however, that turning and sliding is not substantially reduced, and that welding weakens the links and has the effect of reducing resistance to impact shock and increasing the tendency to breakage. I have therefore devised an improved construction which utilizes separate ground gripper elements, movably locked in the links of the cross chain, and mounted so as to be resiliently pressed down by the tire body, whereby the elements grip the ground firmly and positively and lock the cross chain against sliding and skidding. I prefer to design the ground gripper elements with indented teeth which may wear on a horizontal plane, but continually present angular projections to the roadbed which are beveled or triangular in shape or form, to thus provide a contact with the roadbed which is not level or parallel, when the moving vehicle swings to the right or left under the influence of centrifugal force.

Referring to the drawings, the cross chain 10 is of the type mounted between two side chains, not shown, and includes the usual end hook members 11 and cross links 12. Ground gripper elements 13 are mounted in the ground engaging link 12 as illustrated, the number and size of the gripping elements corresponding to the length of the cross chain and the weight and type of the automotive vehicle. Each element has a cylindrical shank 14 passing through the link, an enlarged head 15, and a cupped convex base 16 larger than the shank and which includes a number of prongs 17, the prongs being convexly tapered downwardly on their upper surfaces and cut away at the sides as indicated at 18 to provide a scalloped formation and being cupped as indicated at 19 to provide an arcuate lower surface which extends to the outer surface and forms effective ground engaging and holding teeth. The shanks 14 are preferably of a size to permit a restricted movement of the elements in their links, and the upper portions of the elements are in general alignment with the upper portions of the cross chain links when not in contact with the roadbed, the elements being of a length to provide for a slight depression of the connecting links into the resilient rubber of the tire when the roadbed is engaged. The elements are preferably long enough so that lower portions of the elements extend beyond the level of the lower portions of the cross chain links, and the distance to the point of maximum indentation of the cupped base is preferably equal to or slightly greater than the width of the containing cross chain links, whereby wear of the elements will reduce the length of the indenting teeth to a point equal to the maximum width of the cross chain links, at which point the cross chain and its contained elements remain as an effective anti-skid device having a greatly extended wear factor in the cross chain links.

When the tire chain is in use, the gripping elements resist any turning tendency of the cross chains, as the prongs engage the ground and the heads contact the tire body, the gripping elements being free to turn when off the ground to center themselves in the links. The plurality of prongs in each base ensures a firm ground lock at all times, and the gripping elements have a long and effective life, as they are not scraped or dragged along the ground when in use; as the teeth wear, the cupped arrangement continually presents sharp ground engaging edges.

The gripping elements are free to rotate in their containing links against the wet surface of the rubber tire when a strain is imposed on the cross chain by resistance with ice and snow conditions on the roadbed, and also reduce and limit the strain on the connecting hooks by turning to relieve the pull or thrust on the cross chain.

Figure 5:
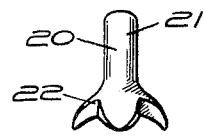
Fig. 5 is a side view of the ground grip element before assembly into its chain link.

The gripping elements are preferably blanked as indicated by the reference numeral 20, Fig. 5, with a vertical cylindrical shank 21 and a pronged cup base 22; the shank 21 is upset after the elements are passed through their links to provide the enlarged head 15, thus locking the elements in their links. This construction provides the advantage that the cross chain and the contained gripping elements may be subjected to head treatment, or the chain and the elements may be separately processed to obtain desired degrees of hardness.

Figure 6:
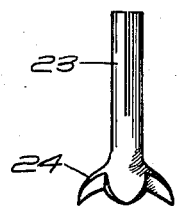
Fig. 6 is a side view of a replacement ground grip element of modified construction.
Figure 8:
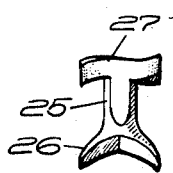
Fig. 8 is a side view of a different form of replacement ground grip element.
Figure 9:
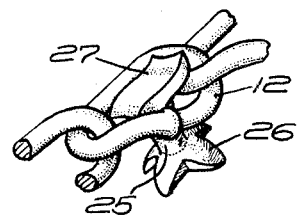
Fig. 9 is a perspective view showing how the ground grip element of Fig. 8 is inserted into a chain link.

Replacement elements may be formed as illustrated in Fig. 6, with a split shank 23 and a pronged base 24, the split shank being passed through a chain link and then bent over in cotter pin fashion to lock the element in the link. Or the element may be formed as illustrated in Fig. 8, with a shank 25, a pronged base 26 and a twisted head 27 of partial helical form and of a size to just pass through a chain link, as shown in Fig. 9; the head 27 may then be hammer tapped to become sufficiently distorted for locking in place, or may become slightly distorted when the chain is used. Other constructions may be utilized as dictated by production requirements, such as locking or spot welding an enlarged disk to the head of the element shanks after insertion in the cross chain links.

Figure 7:
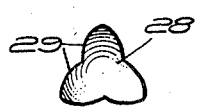
Fig. 7 is a bottom plan view of a ground grip element having a modified grip tooth arrangement.

Although it is preferred to use four prongs or teeth on each element base, the number of prongs or teeth may be changed for different ground gripping effects. Thus, a base 28 with three prongs or teeth 29, as shown in Fig. 7, provide prongs of great strength for heavy duty use.

The novel construction has advantages over standard type wire chains, in that the chains are not weakened, the inserted ground gripping elements are locked in place without welding, the elements are movable so as to always present their prongs to the ground, the prongs remain sharpened despite wear, and the grip is positive and effective and is increased by the resilient pressure of the tire body on the elements, whereby sliding and rolling when the cross chains engage an ice or snow covered roadbed are eliminated.

Although I have described specific constructional embodiments of the invention, it is clear that changes in the size, shape, and arrangement of the parts may be made to suit different tire chain requirements, without departing from the spirit and the scope of the invention as defined in the appended claims.

I claim:

1. A tire chain construction comprising a cross chain having chain links, and ground gripper elements, each element having a shank extending through a selected chain link, a base at the lower end of the shank provided with a plurality of ground gripping prongs, each prong being cut away at the sides and cupped on the lower surface to provide an angular projecting tooth, and an enlarged head at the other end of the shank, whereby each element is movably locked in its selected chain link, said head being a twisted head of partial helical form adapted to just pass through a chain link.

2. A ground gripper element for a tire cross chain, having a shank, a base at the lower end of the shank provided with a plurality of ground gripping prongs, each prong being cut away at the sides and cupped on the lower surface to provide an angular projecting tooth, and an enlarged head at the other end of the shank, said head being a twisted head of partial helical form adapted to just pass through a chain link.

References Cited in the file of this patent

UNITED STATES PATENTS

| | | |
|---|---|---|
| 1,050,422 | Birchwood | Jan. 14, 1913 |
| 1,651,439 | Boyer | Dec. 6, 1927 |
| 2,340,171 | Boyer | Jan. 25, 1944 |
| 2,538,046 | St. Pierre | Jan. 16, 1951 |

FOREIGN PATENTS

| | | |
|---|---|---|
| 2,118 | Great Britain | Jan. 27, 1906 |